US012612749B1

(12) United States Patent
Carnathan

(10) Patent No.: US 12,612,749 B1
(45) Date of Patent: Apr. 28, 2026

(54) SAFETY BARRICADE SYSTEM FOR USE WITH METAL GRATE FLOORING

(71) Applicant: Anthony Eugene Carnathan, Florence, AL (US)

(72) Inventor: Anthony Eugene Carnathan, Florence, AL (US)

( * ) Notice: Subject to any disclaimer, the term of this patent is extended or adjusted under 35 U.S.C. 154(b) by 0 days.

(21) Appl. No.: 19/082,277

(22) Filed: Mar. 18, 2025

(51) Int. Cl.

| | |
|---|---|
| ***E01F 9/615*** | (2016.01) |
| ***E01F 9/681*** | (2016.01) |
| ***F21V 21/104*** | (2006.01) |
| ***F21V 23/04*** | (2006.01) |
| *F21W 111/00* | (2006.01) |

(52) U.S. Cl.
CPC .............. *E01F 9/617* (2016.02); *E01F 9/681* (2016.02); *F21V 21/104* (2013.01); *F21V 23/04* (2013.01); *F21W 2111/00* (2013.01)

(58) Field of Classification Search
CPC .................................. E01F 9/617; E01F 9/681
See application file for complete search history.

(56) References Cited

U.S. PATENT DOCUMENTS 4,480,819 A * 11/1984 Lopez ................ E04G 21/3233 182/113
6,015,139 A * 1/2000 Weber ................ E04H 12/2261 52/298
6,969,185 B1 11/2005 Adair
8,684,571 B1 * 4/2014 Alaura .................... E01F 9/685 362/431
9,243,425 B2 1/2016 Scullion
9,437,109 B1 * 9/2016 Stafford .................. B60Q 7/00
D792,613 S 7/2017 Bar-Or
9,872,364 B2 1/2018 Gamberg
2002/0100636 A1 * 8/2002 Cole .................. E04G 21/3261 182/113
2003/0042072 A1 * 3/2003 Murray ............... E04G 21/3242 182/113
2008/0173854 A1 7/2008 Meaux
2010/0059187 A1 3/2010 Moore
2016/0215462 A1 * 7/2016 Marchetti ............ E01F 13/022
2023/0417000 A1 12/2023 Weiner

FOREIGN PATENT DOCUMENTS

WO 2020190988 9/2020

* cited by examiner

*Primary Examiner* — Christopher E Dunay
(74) *Attorney, Agent, or Firm* — Kyle A. Fletcher, Esq.

(57) ABSTRACT

The safety barricade system for use with metal grate flooring may include a stanchion, one or more retainers, and a warning light. The bottom of the stanchion may detachably couple to a metal grate includes a floor and may be held in place by the one or more retainers. The stanchion may be vertically-oriented such that the top of the stanchion is elevated above the metal grate, placing the top of the stanchion within the cone of vision of a user. The stanchions may be used individually to designate a position. The stanchions may be used in groups and in conjunction with caution tape to designate a boundary. The warning light located at the top of the stanchion may be illuminated to increase the visual awareness of the stanchion.

18 Claims, 5 Drawing Sheets

SAFETY BARRICADE SYSTEM FOR USE WITH METAL GRATE FLOORING

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the fields of safety barricades and accessories for grate flooring, more specifically, a safety barricade system for use with metal grate flooring.

SUMMARY OF INVENTION

The safety barricade system for use with metal grate flooring may comprise a stanchion, one or more retainers, and a warning light. The bottom of the stanchion may detachably couple to a metal grate comprising a floor and may be held in place by the one or more retainers. The stanchion may be adapted to be vertically-oriented such that the top of the stanchion is elevated above the metal grate, placing the top of the stanchion within the cone of vision of a user. The stanchions may be used individually to designate a position. The stanchions may be used in groups and in conjunction with caution tape to designate a boundary. The warning light located at the top of the stanchion may be illuminated to increase the visual awareness of the stanchion.

An object of the invention is to provide a stanchion that may be detachably coupled to grate flooring.

Another object of the invention is to couple the stanchion to an individual slat of the grate flooring via a bottom slot of the stanchion, one or more retainer apertures, and one or more retainers.

A further object of the invention is to provide a warning light that may couple to the top of the stanchion.

Yet another object of the invention is to provide one or more top slots on the stanchion such that caution tape may be coupled to the top of the stanchion.

These together with additional objects, features and advantages of the safety barricade system for use with metal grate flooring will be readily apparent to those of ordinary skill in the art upon reading the following detailed description of the presently preferred, but nonetheless illustrative, embodiments when taken in conjunction with the accompanying drawings.

In this respect, before explaining the current embodiments of the safety barricade system for use with metal grate flooring in detail, it is to be understood that the safety barricade system for use with metal grate flooring is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the safety barricade system for use with metal grate flooring.

It is therefore important that the claims be regarded as including such equivalent construction insofar as they do not depart from the spirit and scope of the safety barricade system for use with metal grate flooring. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Figure 1:
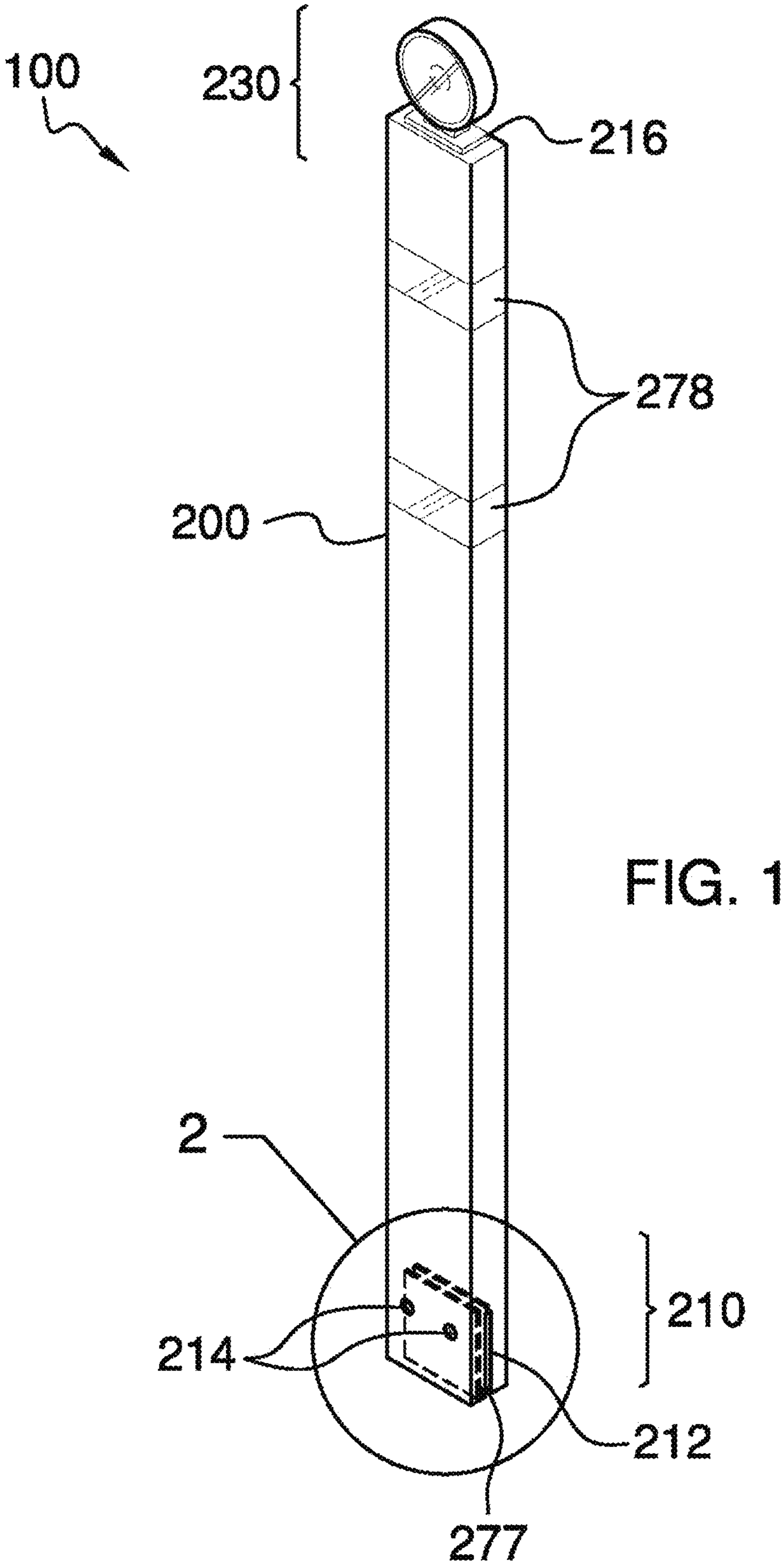
FIG. 1 is an isometric view of an embodiment of the disclosure.
Figure 2:
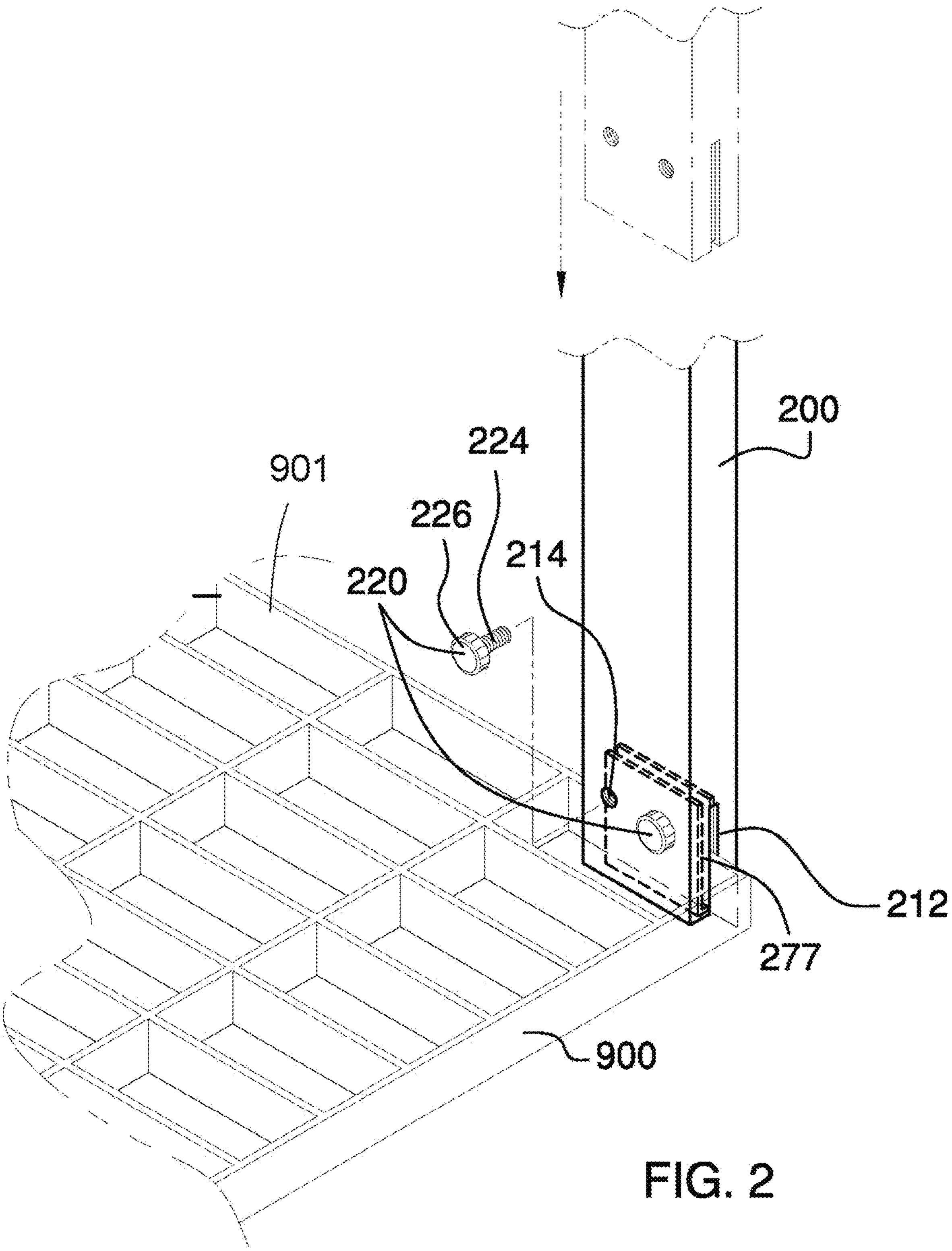
FIG. 2 is a detail view of an embodiment of the disclosure, illustrating the area designated as 2 in FIG. 1.
Figure 3:
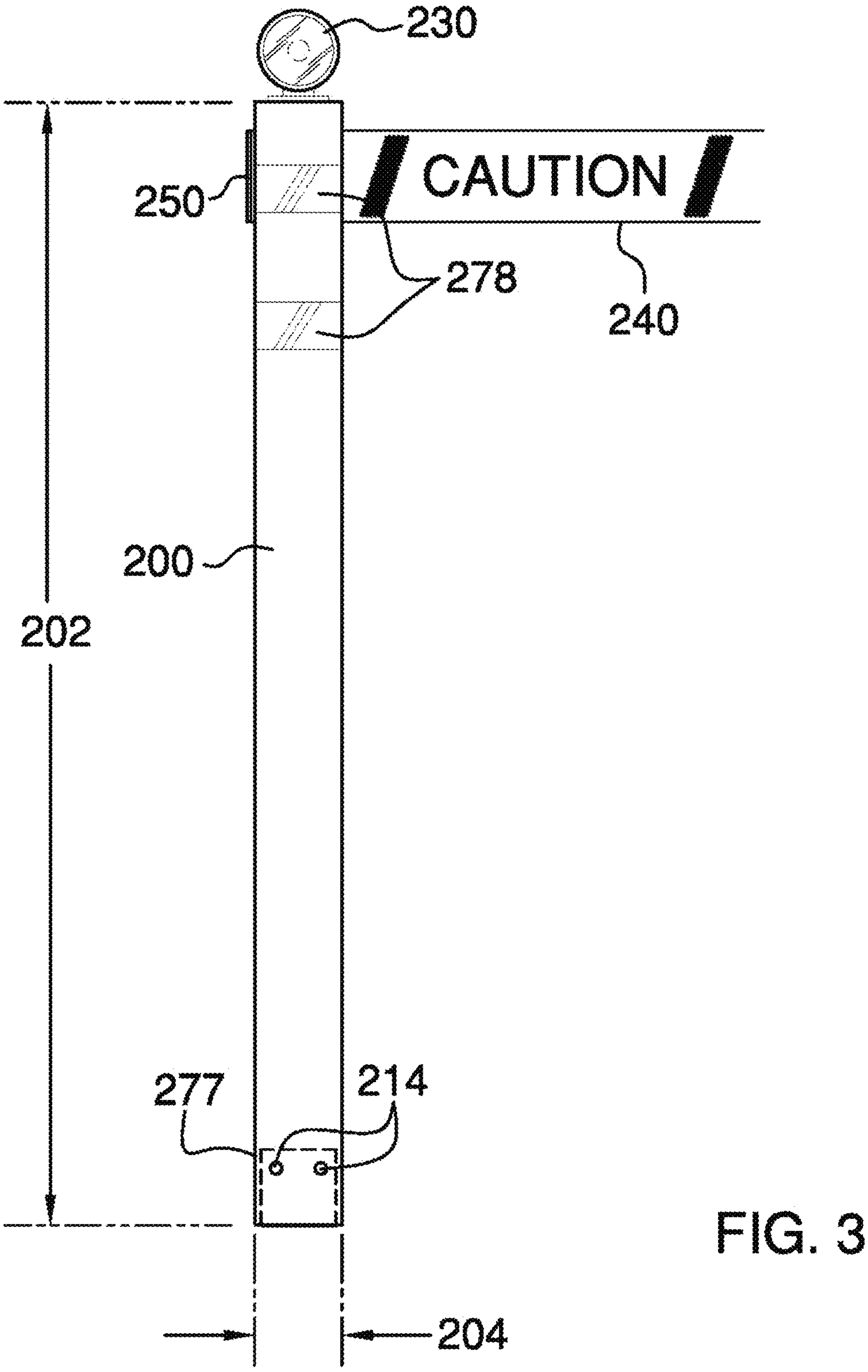
FIG. 3 is a front view of an embodiment of the disclosure.
Figure 4:
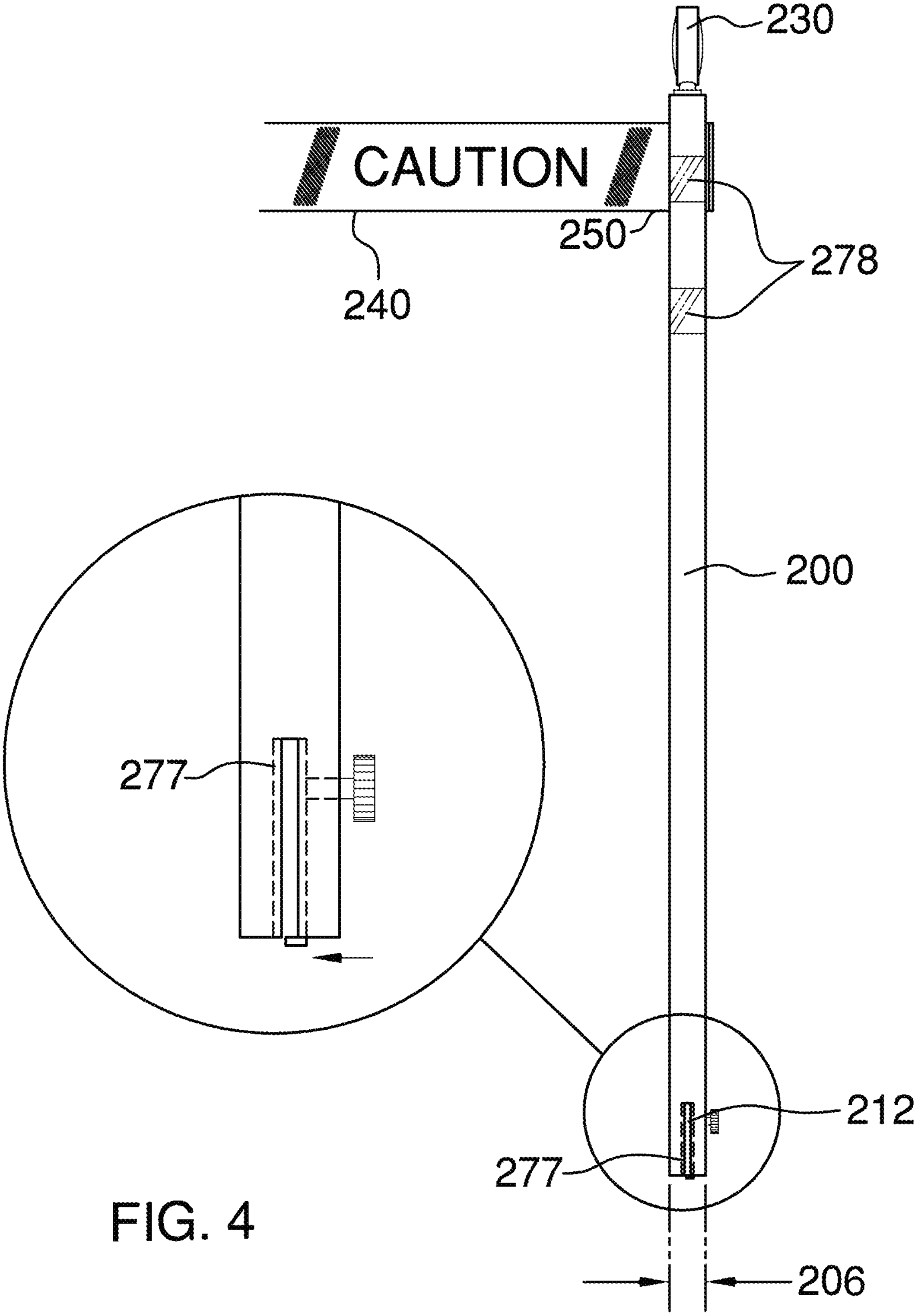
FIG. 4 is a side view of an embodiment of the disclosure.
Figure 5:
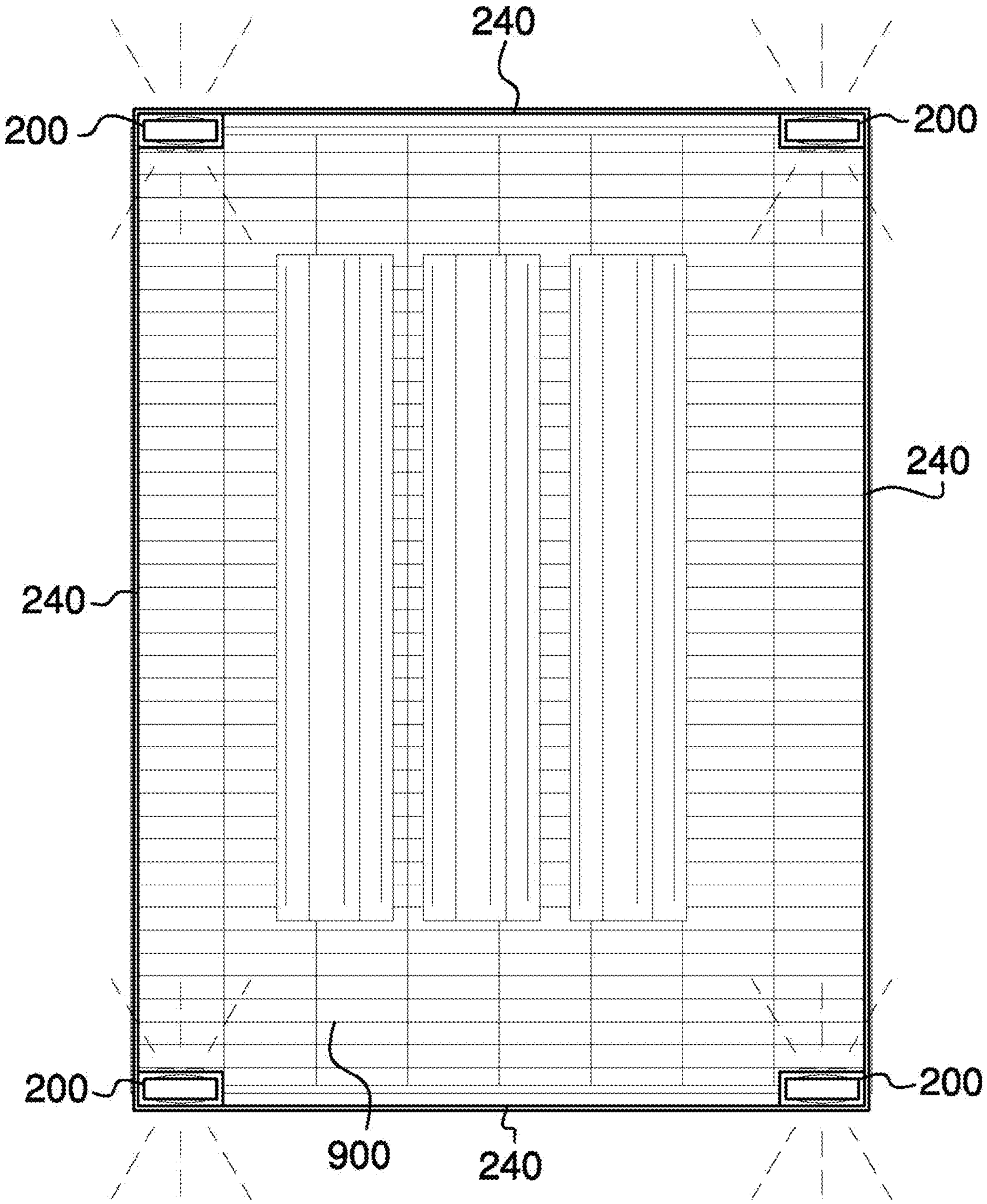
FIG. 5 is a top in-use view of an embodiment of the disclosure.

Detailed reference will now be made to a first potential embodiment of the disclosure, which is illustrated in FIGS. 1 through 5.

The safety barricade system for use with metal grate flooring 100 (hereinafter invention) comprises a stanchion 200, one or more retainers 220, and a warning light 230. The bottom of the stanchion 200 may detachably couple to a metal grate 900 comprising a floor and may be held in place by the one or more retainers 220. The stanchion 200 may be adapted to be vertically-oriented such that the top of the stanchion 200 is elevated above the metal grate 900, placing the top of the stanchion 200 within the cone of vision of a user. The stanchions 200 may be used individually to designate a position. The stanchions 200 may be used in groups and in conjunction with caution tape 240 to designate a boundary. The warning light 230 located at the top of the stanchion 200 may be illuminated to increase the visual awareness of the stanchion 200.

The stanchion 200 may be a post comprising a rectangular footprint. The stanchion 200 may be defined by a height 202, a length 204, and a width 206. As non-limiting examples, the height 202 may be 36.0 inches to 48.0 inches.

The bottom of the stanchion 200 may comprise a grate coupler 210 for coupling the stanchion 200 to the metal grate 900 and the top of the stanchion 200 may comprise a light coupler 216 for coupling the warning light 230 to the stanchion 200. The grate coupler 210 may comprise a bottom slot 212 and one or more retainer apertures 214. The bottom slot 212 may be vertically-oriented and may pass through the center of the bottom of the stanchion 200 along the length 204 of the stanchion 200. The bottom slot 212 may be open at the bottom of the stanchion 200 such that the stanchion 200 may be lowered onto an individual slat of the metal grate 900 with the individual slat entering the bottom slot 212 and the bottom of the stanchion 200 straddling the individual slat.

The one or more retainer apertures 214 may be located on the side of the stanchion 200 adjacent to the bottom edge. The one or more retainer apertures 214 may be horizontally-oriented such that the center axis of the one or more retainer apertures 214 may be perpendicular to the plane of the bottom slot 212. The one or more retainer apertures 214 may be threaded to accept the one or more retainers 220.

The one or more retainers 220 may threadedly couple to the stanchion 200 and may be operable to retain the stanchion 200 on the individual slat of the metal grate 900. An individual retainer selected from the one or more retainers 220 may comprise a threaded shaft 224 and a knob handle 226. The threaded shaft 224 may threadedly couple to an individual retainer aperture selected from the one or more retainer apertures 214. The knob handle 226 may be adapted to be grasped by the user in order to turn the individual retainer.

The individual retainer may be threaded into the individual retainer aperture by turning the individual retainer in a first rotational direction. The individual retainer may press against an individual slat 901 of a metal grate 900 as the individual retainer is threaded into the individual retainer aperture thus pinching the individual slat between the stanchion 200 and the individual retainer and holding the stanchion 200 on the individual slat.

The individual retainer may be threaded out of the individual retainer aperture by turning the individual retainer in a second rotational direction which is opposite the first rotational direction. The individual retainer may release the individual slat as the individual retainer is threaded out of the individual retainer aperture such that the stanchion 200 may be removed from the individual slat.

The warning light 230 may be detachably coupled to the top of the stanchion 200. The warning light 230 may be battery operated from one or more batteries contained within the warning light 230. The warning light 230 may comprise a switch that may be operable to activate the warning light 230. The warning light may display a color associated with a warning. As non-limiting examples, the warning light 230 may be amber, yellow, orange, or red. In some embodiments, the warning light 230 may blink to call attention to the stanchion 200. As a non-limiting example, the warning light 230 may blink at a frequency of 3.0 Hz to 5.0 Hz.

The top of the stanchion 200 may comprise one or more top slots 250 for retaining the caution tape 240. The caution tape 240 may be stretched between the stanchions 200 to create a barrier. The one or more top slots 250 may be vertically-oriented and may be at least the height of the caution tape 240. The one or more top slots 250 may be accessible on two of more side faces of the stanchion 200. The caution tape 240 may be yellow, black, red, or any combination thereof. The caution tape 240 may comprise indicia which may be textual, graphical, or any combination thereof. As non-limiting examples, the text may convey a warning or instructional message such as CAUTION, WARNING, KEEP OUT, DO NOT ENTER, DANGER, or a custom message. As non-limiting examples, the graphical symbol may comprise diagonal lines and/or warning symbols such as biohazard, radiation hazard, flammable, toxic, or any combination thereof.

In a preferred embodiment, the height 202 may be 45.0 inches +/−0.5 inches, the length 204 may be 3.5 inches +/−0.25 inches, and the width 206 may be 1.5 inches +/−0.25 inches.

In use, a stanchion 200 may be coupled to the slat 901 of the metal grate 900 by lowering the stanchion 200 onto the individual slat such that the individual slat is positioned within the bottom slot 212 of the stanchion 200, by threading the one or more retainers 220 into the one or more retainer apertures 214 located at the bottom of the stanchion 200, and by tightening the one or more retainers 220. The one or more retainers 220 may be tightened by rotating the one or more retainers 220 in a first rotational direction until the one or more retainers 220 are pressing against the individual slat. The stanchion 200 may be removed by loosening the one or more retainers 220 and by lifting the stanchion 200. The one or more retainers 220 may be loosened by rotating the one or more retainers 220 in a second rotational direction.

The one or more retainers 220 may further include a plate member 277 that works with the threaded shaft 224 to tighten the respective one or more retainer 220 onto the metal grate 900. The plate member 900 enables the one or more retainers 220 to provide a compression force on the metal grate 900.

The stanchions 200 may be used individually or in groups with caution tape 240 stretched between the stanchions 200. The stanchions 200 may be used individually to create markers, in groups of two or more to create barriers, in groups of three or more to create perimeters, or any combination thereof. As non-limiting examples, the markers may be operable to designate positions, the barriers may prevent movement past boundaries, and the perimeters may prevent movement into or out of areas.

The stanchion 200 may comprise a grate coupler 210 for coupling the stanchion 200 to the metal grate 900 and the top of the stanchion 200 may comprise a light coupler 216 for coupling the warning light 230.

Each of the stanchions 200 may include one or more reflective strips 278. The one or more reflective strips 278 may be positioned under the warning light 230 in order to provide enhanced visibility of the invention 100 when in use.

Definitions

Unless otherwise stated, the words "up", "down", "top", "bottom", "upper", and "lower" should be interpreted within a gravitational framework. "Down" is the direction that gravity would pull an object. "Up" is the opposite of "down". "Bottom" is the part of an object that is down farther than any other part of the object. "Top" is the part of an object that is up farther than any other part of the object. "Upper" may refer to top and "lower" may refer to the bottom. As a non-limiting example, the upper end of a vertical shaft is the top end of the vertical shaft.

As used in this disclosure, an "aperture" may be an opening in a surface or object. Aperture may be synonymous with hole, slit, crack, gap, slot, or opening.

Throughout this document the terms "battery", "battery pack", and "batteries" may be used interchangeably to refer to one or more wet or dry cells or batteries of cells in which chemical energy is converted into electricity and used as a source of DC power. References to recharging or replacing batteries may refer to recharging or replacing individual cells, individual batteries of cells, or a package of multiple battery cells as is appropriate for any given battery technology that may be used. The battery may require electrical contacts which may not be illustrated in the figures.

As used herein, the words "couple", "couples", "coupled" or "coupling", may refer to connecting, either directly or indirectly, and does not necessarily imply a mechanical connection.

As used in this disclosure, the term "flooring" may refer to the physical structure that forms the physical horizontal surface of a floor.

As used here, "footprint" may refer to a projection of an object onto the surface that supports the object. The projection is usually, but not always, vertically downward.

As used in this disclosure, "frequency" may be a count of the number of repetitions of a cyclic process has been completed within a set period of time.

As used herein, "front" may indicate the side of an object that is closest to a forward direction of travel under normal use of the object or the side or part of an object that normally presents itself to view or that is normally used first. "Rear" or "back" may refer to the side that is opposite the front.

As used herein, "handle" may refer to an object or aperture by which a tool, object, or door is held or manipulated with the hand.

As used in this disclosure, "horizontal" may be a directional term that refers to a direction that is perpendicular to the local force of gravity. Unless specifically noted in this disclosure, the horizontal direction is always perpendicular to the vertical direction.

As used in this disclosure, the term "indicia" may refer to one or more markings that identify a sentiment.

As used in this disclosure, a "perimeter" may be one or more curved or straight lines that bound an enclosed area on a plane or surface. The perimeter of a circle is commonly referred to as a circumference.

As used herein, "rectangle" and "rectangular" may refer to a closed figure comprising four straight lines joined by four right angles. The opposing sides of a rectangle have equal length. A square is considered to be a special type of rectangle where all four sides are the same length. An object may still be considered to have a generally rectangular shape even if corners of the object are rounded off as long as two sets of opposing, straight-line, perpendicular sides are apparent.

As used in this disclosure, the term "shaft" may be used to describe a rigid cylinder. A shaft is often used as the handle of a tool or implement or as the center of rotating machinery or motors. The definition of shaft explicitly includes solid shafts or shafts that comprise a hollow passage through the shaft along the center axis of the shaft cylinder, whether the shaft has one or more sealed ends or not.

As used in this disclosure, a "slot" may be a prism-shaped negative space formed as a groove, cut, opening, or aperture in or through an object.

As used in this disclosure, a "stanchion" may refer to a vertical pole, post, or support.

As used herein, "such as" may introduce one or more non-limiting examples.

As used in this disclosure, "vertical" may refer to a direction that is parallel to the local force of gravity. Unless specifically noted in this disclosure, the vertical direction is always perpendicular to horizontal.

With respect to the above description, it is to be realized that the optimum dimensional relationship for the various components of the invention described above and in FIGS. 1 through 5, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A safety barricade system for use with metal grate flooring comprising:

a stanchion, one or more retainers, and a warning light;

wherein the bottom of the stanchion detachably couples to a metal grate comprising a floor and is held in place by the one or more retainers;

wherein the stanchion is adapted to be vertically-oriented such that the top of the stanchion is elevated above the metal grate, placing the top of the stanchion within the cone of vision of a user;

wherein the stanchions are used individually to designate a position;

wherein the stanchions are used in groups and in conjunction with caution tape to designate a boundary;

wherein the warning light located at the top of the stanchion is illuminated to increase the visual awareness of the stanchion;

wherein the bottom of the stanchion comprises a grate coupler for coupling the stanchion to the metal grate and the top of the stanchion comprises a light coupler for coupling the warning light to the stanchion:

wherein the grate coupler comprises a bottom slot and one or more retainer apertures;

wherein the bottom slot is vertically-oriented and passes through the center of the bottom of the stanchion along the length of the stanchion.

2. The safety barricade system for use with metal grate flooring according to claim 1 wherein the stanchion is a post comprising a rectangular footprint;

wherein the stanchion is defined by a height, a length, and a width.

3. The safety barricade system for use with metal grate flooring according to claim 2 wherein the height is 36.0 inches to 48.0 inches.

4. The safety barricade system for use with metal grate flooring according to claim 1 wherein the bottom slot is open at the bottom of the stanchion such that the stanchion is lowered onto an individual slat of the metal grate with the individual slat entering the bottom slot and the bottom of the stanchion straddling the individual slat.

5. The safety barricade system for use with metal grate flooring according to claim 4 wherein the one or more retainer apertures are located on the side of the stanchion adjacent to the bottom edge.

6. The safety barricade system for use with metal grate flooring according to claim 5 wherein the one or more retainer apertures are horizontally-oriented such that the center axis of the one or more retainer apertures are perpendicular to the plane of the bottom slot.

7. The safety barricade system for use with metal grate flooring according to claim 6 wherein the one or more retainer apertures are threaded to accept the one or more retainers.

8. The safety barricade system for use with metal grate flooring according to claim 7 wherein the one or more retainers threadedly couple to the stanchion and are operable to retain the stanchion on the individual slat of the metal grate;

wherein an individual retainer selected from the one or more retainers comprises a threaded shaft and a knob handle;

wherein the threaded shaft threadedly couples to an individual retainer aperture selected from the one or more retainer apertures;

wherein the knob handle is adapted to be grasped by the user in order to turn the individual retainer.

9. The safety barricade system for use with metal grate flooring according to claim 8 wherein the individual retainer is threaded into the individual retainer aperture by turning the individual retainer in a first rotational direction;

wherein the individual retainer presses against the individual slat as the individual retainer is threaded into the individual retainer aperture thus pinching the individual slat between the stanchion and the individual retainer and holding the stanchion on the individual slat.

10. The safety barricade system for use with metal grate flooring according to claim 9 wherein the individual retainer is threaded out of the individual retainer aperture by turning the individual retainer in a second rotational direction which is opposite the first rotational direction;

wherein the individual retainer releases the individual slat as the individual retainer is threaded out of the individual retainer aperture such that the stanchion is removable from the individual slat.

11. The safety barricade system for use with metal grate flooring according to claim 10 wherein the warning light is detachably coupled to the top of the stanchion;

wherein the warning light is battery operated from one or more batteries contained within the warning light;

wherein the warning light comprises a switch that is operable to activate the warning light.

12. The safety barricade system for use with metal grate flooring according to claim 11 wherein the warning light displays a color associated with a warning.

13. The safety barricade system for use with metal grate flooring according to claim 12 wherein the warning light is amber, yellow, orange, or red;

wherein the warning light blinks at a frequency of 3.0 Hz to 5.0 Hz.

14. The safety barricade system for use with metal grate flooring according to claim 11 wherein the warning light blinks to call attention to the stanchion.

15. The safety barricade system for use with metal grate flooring according to claim 14 wherein each of the stanchions include one or more reflective strips;

wherein the one or more reflective strips are positioned under the warning light in order to provide enhanced visibility of the safety barricade system when in use.

16. The safety barricade system for use with metal grate flooring according to claim 11 wherein the top of the stanchion comprises one or more top slots for retaining the caution tape;

wherein the caution tape is stretched between the stanchions to create a barrier;

wherein the one or more top slots are vertically-oriented and are at least the height of the caution tape.

17. The safety barricade system for use with metal grate flooring according to claim 16 wherein the one or more top slots are accessible on two of more side faces of the stanchion.

18. The safety barricade system for use with metal grate flooring according to claim 17 wherein the one or more retainers further comprises a plate member that works with the threaded shaft to tighten the respective one or more retainer onto the metal grate;

wherein the plate member enables the one or more retainers to provide a compression force on the metal grate.

* * * * *